US007014022B2

(12) United States Patent
Sauvonnet et al.

(10) Patent No.: US 7,014,022 B2
(45) Date of Patent: Mar. 21, 2006

(54) CLUTCH PEDAL DESIGNED TO EQUIP A MOTOR VEHICLE

(75) Inventors: Franck Sauvonnet, Fontenay sous Bois (FR); Brian N. Orr, Chesterfield Township, MI (US); Waldemar W. Gmurowski, Sterling Heights, MI (US)

(73) Assignees: Peugeot Citroën Automobiles SA, Neuilly sur Seine (FR); part interest; Delphi Technologies, Inc., Troy, MI (US); part interest ( * ) Notice: Subject to any disclaimer, the term of this patent is extended or adjusted under 35 U.S.C. 154(b) by 127 days.

(21) Appl. No.: 10/297,033

(22) PCT Filed: Feb. 18, 2002

(86) PCT No.: PCT/FR02/00605

§ 371 (c)(1), (2), (4) Date: Nov. 27, 2002

(87) PCT Pub. No.: WO02/067072

PCT Pub. Date: Aug. 29, 2002

(65) Prior Publication Data

US 2003/0126941 A1 Jul. 10, 2003

(30) Foreign Application Priority Data

Feb. 19, 2001 (FR) .......................................... 01 02215

(51) Int. Cl.
*G05G 1/14* (2006.01)
*F16D 67/02* (2006.01)

(52) U.S. Cl. ......................... 192/13 R; 74/512; 74/522; 180/334; 192/99 S

(58) Field of Classification Search ................... 74/512, 74/560, 522; 192/13 R, 99 S; 180/334
See application file for complete search history.

(56) References Cited

U.S. PATENT DOCUMENTS

| | | | | | |
|---|---|---|---|---|---|
| 3,059,960 | A | | 10/1962 | Komorowski et al. | |
| 3,511,109 | A | * | 5/1970 | Tanaka | 74/560 |
| 5,078,024 | A | | 1/1992 | Cicotte et al. | |
| 5,183,308 | A | | 2/1993 | Koga et al. | |
| 5,771,752 | A | * | 6/1998 | Cicotte | 74/512 |
| 6,073,515 | A | | 6/2000 | Elton et al. | |
| 6,151,985 | A | | 11/2000 | Garber et al. | |
| 6,189,409 | B1 | | 2/2001 | Neag et al. | |
| 6,314,831 | B1 | | 11/2001 | Rixon et al. | |
| 6,360,629 | B1 | | 3/2002 | Schambre et al. | |
| 6,364,047 | B1 | | 4/2002 | Bortolon | |
| 6,367,348 | B1 | * | 4/2002 | Toelke et al. | 74/512 |
| 6,450,061 | B1 | * | 9/2002 | Chapman et al. | 74/512 |
| 6,510,761 | B1 | | 1/2003 | Zhang et al. | |
| 6,527,327 | B1 | | 3/2003 | Gaus et al. | |
| 6,584,871 | B1 | * | 7/2003 | Burton et al. | 74/512 |
| 2002/0157497 | A1 | | 10/2002 | Porter et al. | |
| 2003/0094070 | A1 | | 5/2003 | O'Neill | |

FOREIGN PATENT DOCUMENTS

| | | | | |
|---|---|---|---|---|
| DE | 19916812 | | | 9/1999 |
| EP | 0 353 958 | A1 | * | 2/1990 |
| EP | 0410815 | | | 1/1991 |
| GB | 12788919 | | | 6/1972 |
| JP | 10297345 | | | 11/1998 |
| KR | 99034614 | | | 5/1999 |
| WO | WO/0073099 | | | 12/2000 |

* cited by examiner

*Primary Examiner*—Rodney H. Bonck
(74) *Attorney, Agent, or Firm*—Gary M. Cohen

(57) ABSTRACT

A clutch pedal (1) for a vehicle, in particular, a motor vehicle, includes at least one side plate (2*a*, 2*b*) mounted for rotation spindle (3) connectable to the bulkhead of the vehicle. A peg (5) is fixed to one end of a pedal web (4) and slides in a first slot (21) provided in the side plate. A movement mechanism (7) causes the peg to slide in the slot, defining a length (L) between the rotation spindle of the side plate and the other end of the pedal web. A stud (8) is mounted in the side plate (2*a*) at a distance (R) from the rotation spindle, for receiving the end of the rod of the clutch mechanism of the vehicle. The clutch pedal operates to provide a constant step-down ratio (L/R).

13 Claims, 2 Drawing Sheets

CLUTCH PEDAL DESIGNED TO EQUIP A MOTOR VEHICLE

BACKGROUND OF THE INVENTION

The present invention relates to an adjustable clutch pedal for use in a vehicle, particularly a motor vehicle.

It is known practice for adjustable pedalboxes to be fitted in motor vehicles. Some are currently used in vehicles equipped with automatic gearboxes, and are controlled from a control unit which is accessible from the driving position. The term "adjustable" means that all or part of the pedalbox can be moved longitudinally of the vehicle, closer to or away from the driver's seat, so that it is made possible to tailor the position of at least part of the pedalbox to the position of the driver's seat, and therefore, to the driver's size.

It is also known practice, in vehicles equipped with mechanical gearboxes, to provide a clutch pedal which can be adjusted to suit the size of the driver. One known adjustable clutch pedal includes at least one side plate which is mounted for rotation about a rotation spindle, and which is configured for connection to the bulkhead of the vehicle. A peg is fixed to one end of a pedal web, and is configured to slide in a slot provided in the side plate. A movement mechanism is provided to cause the peg to slide in the slot, defining a length (L) between the rotation spindle of the side plate and the other end of the pedal web. A stud is mounted in the side plate at a distance (R) from the rotation spindle, and is configured to receive the end of a rod associated with the clutch mechanism of the vehicle.

This type of adjustable clutch pedal is not entirely satisfactory, particularly for small drivers. The reason is that once the pedal has been adjusted, the operation of the clutch effected by the driver is not necessarily strong enough to permit the desired gear to be correctly engaged because the working travel of the pedal is not compensated for.

SUMMARY OF THE INVENTION

The object of the present invention is to provide an adjustable clutch pedal of the previously mentioned type, the useful travel of which can be compensated for regardless of its position.

To this end, the subject of the present invention is a clutch pedal for a vehicle, particularly a motor vehicle, which includes at least one side plate which is mounted for rotation about a rotation spindle, and which is configured for connection to the bulkhead of the vehicle. A peg is fixed to one end of a pedal web, and is configured to slide in a first slot provided in the side plate. A movement mechanism is provided to cause the peg to slide in the slot, defining a length (L) between the rotation spindle of the side plate and the other end of the pedal web. A stud is mounted in the side plate at a distance (R) from the rotation spindle, and is configured to receive the end of a rod associated with the clutch mechanism of the vehicle.

In accordance with the present invention, the adjustable clutch pedal is further provided with means for obtaining a constant step-down ratio (L/R). A preferred means for obtaining such a constant step-down ratio includes a link rod, one end of which is secured to the pedal web and the other end of which is secured to a cam. The cam is equipped with a second slot for slidingly receiving the stud and for causing the stud to translate in a third slot provided in the side plate.

The movement mechanism further advantageously comprises an angled reduction gearbox which is coupled to a worm. A nut is secured to the pedal web, and can slide on the worm. The worm and the angled reduction gearbox are preferably fixed to one of the faces of the side plate.

The link rod can be secured directly to the pedal web via the peg. The cam can be secured directly to the side plate via a pivot connection. The link rod can be secured to the cam via a pivot connection.

The length of the link rod, the shape of the slot of the cam and the location of the pivot connections between the link rod and the cam and between the cam and the side plate, respectively, are preferably capable of being modified as the driver wishes.

The present invention also relates to a pedalbox module, which can be fitted in a motor vehicle, and which includes an adjustable clutch pedal which is produced in accordance with the present invention. The pedalbox module further advantageously includes a brake pedal having a movement mechanism which makes it possible to achieve the same spatial movement for the brake pedal as is achieved with the clutch pedal.

Other advantages and features will become apparent from the detailed description which is provided below, together with the following illustrations.

DETAILED DESCRIPTION OF THE INVENTION

Figure 1B:
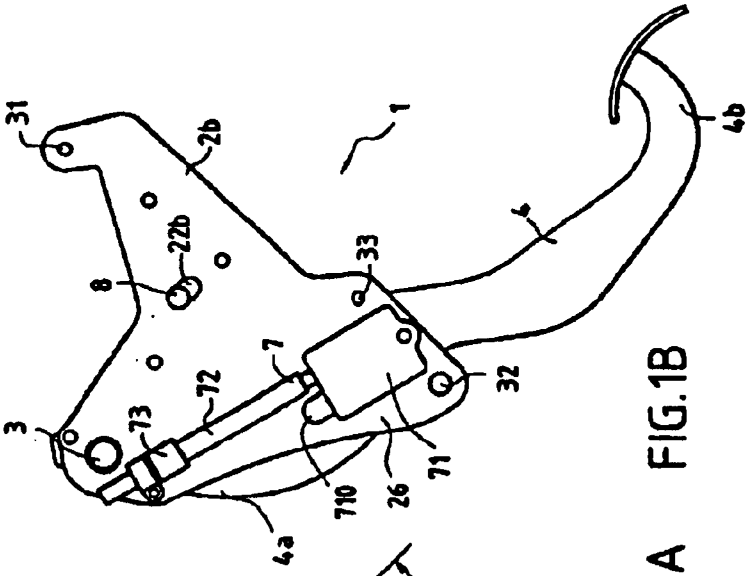
FIGS. 1A and 1B are side views of a clutch pedal produced in accordance with the present invention.
Figure 1A:
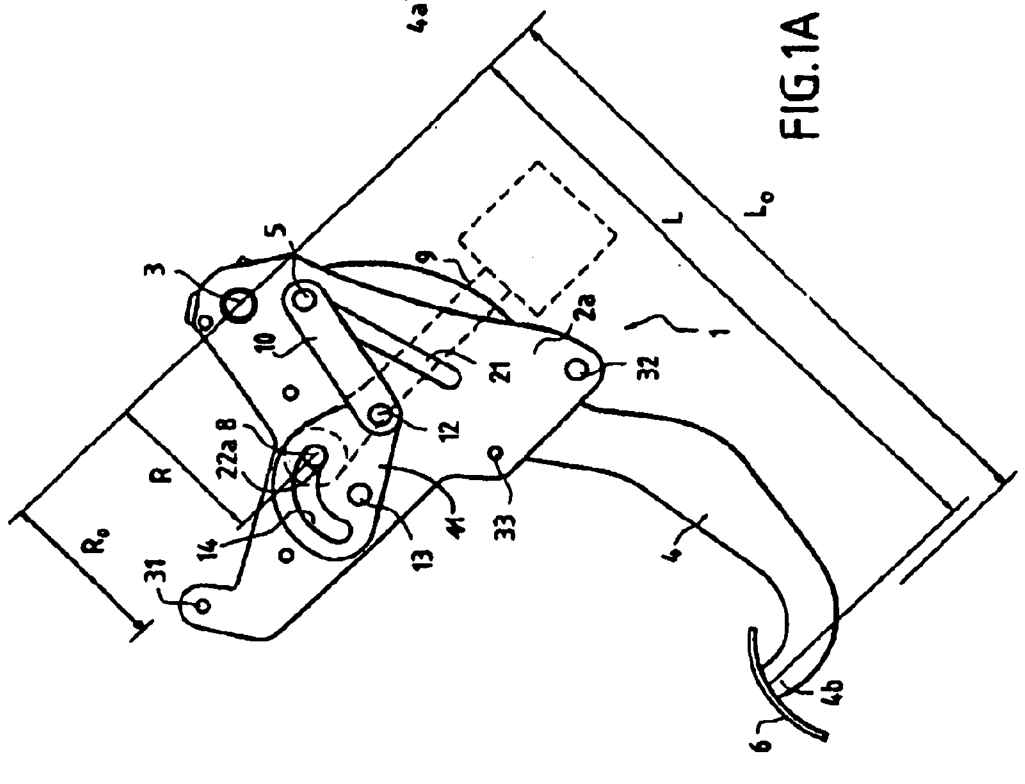

As is shown in FIGS. 1A and 1B, the clutch pedal 1 includes a pair of side plates 2*a*, 2*b* which are mutually parallel and which are mounted for rotation about a rotation spindle 3. The rotation spindle 3 is mounted on a pedalbox support (not shown), on which a brake pedal is also mounted, for connection to the bulkhead of a motor vehicle (also not shown). A reinforced peg 31 is also fixedly mounted between upper portions of the two side plates 2*a*, 2*b*, parallel to the rotation spindle 3. An assistance spring (not shown) can be fixed on the reinforced peg 31. A pedal web 4 can slide between a pair of rollers 32, 33 mounted between lower portions of the two side plates 2*a*, 2*b*.

A peg 5 is fixed to the upper end 4*a* of the pedal web 4, and is capable of sliding in a slot 21 provided in the side plates 2*a*, 2*b*. A block 6 is fixed to the lower end 4*b* of the pedal web 4, and has a shape which is known, per se, and a size suited to the vehicle.

A movement mechanism 7 is provided on the outer face of the side plate 2*b*, to cause the peg 5 to slide in the slot 21. A length (L) is defined between the rotation spindle 3 and the lower end 4*b* of the pedal web 4, approximately at the middle of the block 6. The movement mechanism 7 includes an angled reduction gearbox 71 coupled to a worm 72. A nut 73 is secured to the pedal web 4 and can slide on the worm 72. The angled reduction gearbox 71 includes a gearset, which is known per se and not depicted in the figures. The input 710 of the angled reduction gearbox 71 is in known fashion connected to an electric motor by a transmission cable. For reasons of cost and space, this electric motor also preferably powers other mechanisms for moving other pedals.

A stud 8 is mounted so that the stud 8 is free to translate in two slots 22*a*, 22*b* provided in the two side plates 2*a*, 2*b*.

The slots 22a, 22b have an identical shape, and the two side plates 2a, 2b are mutually parallel. A distance (R) is defined between the stud 8 and the rotation spindle 3. An end of the hydraulic rod 9 of the clutch mechanism (shown in dotted lines) is clipped to the stud 8. The stud 8 can connect with a hydraulic clutch mechanism 9, as shown, or can connect with a clutch cable in a manner which is per se known.

The clutch pedal 1 also includes a link rod 10. One end of the link rod 10 is fixed to the peg 5 and the other end of the link rod 10 is fixed to a cam 11 through a pivot connection 12. The cam 11 is itself mounted to pivot about a spindle 13 which is fixed to the side plate 2a and which is provided with a second slot 14 having a semicircular overall shape which is off-axis with respect to the spindle 13 about which it rotates. The stud 8 slides in the slot 14.

Figure 2:
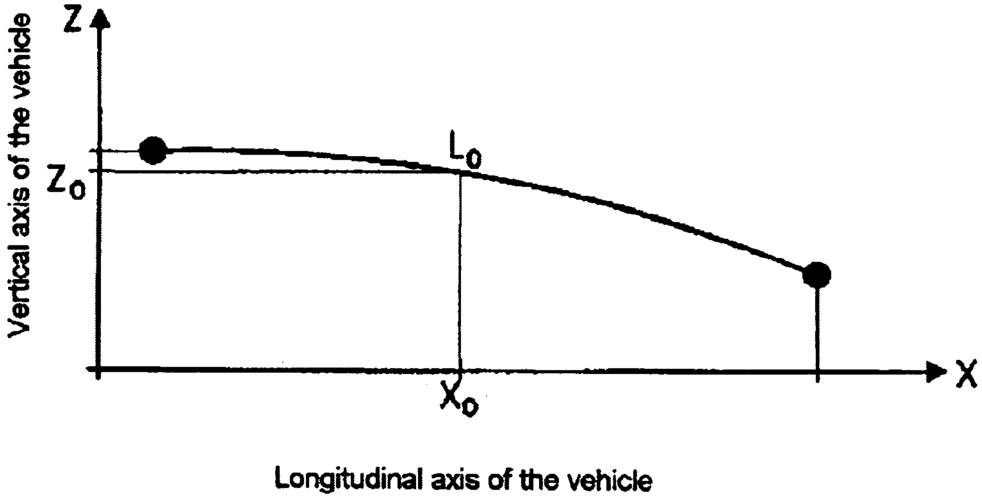
FIG. 2 is a schematic illustration of the path followed by the lower end of the pedal web.

Adjustment of the above-described clutch pedal, when equipped in a vehicle, will now be described. When the driver of the vehicle enters the vehicle, the position of the clutch pedal 1 can be adjusted by actuating the electric motor connected to the angled reduction gearbox 71. The angled reduction gearbox 71 transmits rotational movement to the worm 72, which moves the nut 73 along the worm, parallel to the side plates 2a, 2b. This causes the peg 5 of the pedal web 4 to slide in the slot 21, which in turn causes the length (L) between the lower end 4b of the pedal web 4 and the rotation spindle 3 to vary along the path which is schematically shown in FIG. 2. The motor is actuated until a length ($L_0$) corresponding to a satisfactory driving position for the driver is reached.

At the same time, the link rod 10 slides downward and moves the cam 11, which causes the stud 8 to translate along the slots 22a, 22b in the side plates 2a, 2b. As a result, the distance (R) is modified until a value ($R_0$) is reached, so that the ratio ($L_0/R_0$) is equal to the initial ratio. Thus, the clutch pedal 1 has a step-down ratio (L/R) that remains constant regardless of the position of the clutch pedal 1 with respect to the bulkhead, i.e., regardless of its travel. As far as the driver is concerned, this is manifested in the application of constant, clutch forces.

It will also be apparent that numerous modifications of the foregoing can be made without departing from the scope of the present invention.

What is claimed is:

1. An adjustable clutch pedal for a vehicle, comprising at least one side plate mounted for rotation about a rotation spindle and connectable to a bulkhead of the vehicle, a pedal web having a peg fixed to a first end and slidably received in a first slot in the side plate, a movement mechanism for causing the peg to slide in the first slot and defining a length (L) between the rotation spindle of the side plate and a second end of the pedal web, a stud mounted in the side plate at a distance (R) from the rotation spindle, for receiving an end of a rod of a clutch mechanism associated with the vehicle, and a link rod having a first end secured to the pedal web and a second end secured to a cam, wherein the cam has a second slot for slidingly receiving the stud, and wherein the side plate includes a third slot for receiving the stud and for causing translation of the stud to obtain a constant step-down ratio (L/R).

2. The pedal of claim 1 wherein the movement mechanism includes an angled reduction gearbox coupled to a worm which slidingly receives a nut secured to the pedal web.

3. The pedal of claim 2 wherein the worm and the angled reduction gearbox are fixed to a face of the side plate.

4. The pedal of claim 1 wherein the link rod is secured directly to the pedal web by the peg.

5. The pedal of claim 1 wherein the cam is secured directly to the side plate by a pivot connection.

6. The pedal of claim 1 wherein the side plate further includes a reinforced peg for receiving an assistance spring.

7. A pedalbox module for a motor vehicle, comprising an adjustable clutch pedal including at least one side plate mounted for rotation about a rotation spindle and connectable to a bulkhead of the vehicle, a pedal web having a peg fixed to a first end and slidably received in a first slot in the side plate, a movement mechanism for causing the peg to slide in the first slot and defining a length (L) between the rotation spindle of the side plate and a second end of the pedal web, a stud mounted in the side plate at a distance (R) from the rotation spindle, for receiving an end of a rod of a clutch mechanism associated with the vehicle, and a link rod having a first end secured to the pedal web and a second end secured to a cam, wherein the cam has a second slot for slidingly receiving the stud, and wherein the side plate includes a third slot for receiving the stud and for causing translation of the stud to obtain a constant step-down ratio (L/R).

8. The pedalbox module of claim 7 which further includes a brake pedal having a movement mechanism for achieving a spatial movement which is the same as a spatial movement achieved for the clutch pedal.

9. The pedalbox module of claim 7 wherein the movement mechanism includes an angled reduction gearbox coupled to a worm which slidingly receives a nut secured to the pedal web.

10. The pedalbox module of claim 9 wherein the worm and the angled reduction gearbox are fixed to a face of the side plate.

11. The pedalbox module of claim 7 wherein the link rod is secured directly to the pedal web by the peg.

12. The pedalbox module of claim 7 wherein the cam is secured directly to the side plate by a pivot connection.

13. The pedalbox module of claim 7 wherein the side plate includes a reinforced peg for receiving an assistance spring.

* * * * *